US009723436B2

(12) United States Patent
Bedi et al.

(10) Patent No.: US 9,723,436 B2
(45) Date of Patent: Aug. 1, 2017

(54) MOBILE DEVICE LOCATION

(71) Applicant: INTERNATIONAL BUSINESS MACHINES CORPORATION, Armonk, NY (US)

(72) Inventors: Bharat V. Bedi, Southsea (GB); Robert B. Nicholson, Southsea (GB)

(73) Assignee: International Business Machines Corporation, Armonk, NY (US)

(*) Notice: Subject to any disclaimer, the term of this patent is extended or adjusted under 35 U.S.C. 154(b) by 180 days.

(21) Appl. No.: 14/553,252

(22) Filed: Nov. 25, 2014

(65) Prior Publication Data
US 2015/0156607 A1 Jun. 4, 2015

(30) Foreign Application Priority Data
Dec. 3, 2013 (GB) .................. 1321296.4

(51) Int. Cl.
H04W 24/00 (2009.01)
H04W 4/02 (2009.01)
(52) U.S. Cl.
CPC .................... H04W 4/02 (2013.01)
(58) Field of Classification Search
CPC .................................... H04W 4/02
USPC .............. 455/456.1–456.4; 370/338
See application file for complete search history.

(56) References Cited

U.S. PATENT DOCUMENTS 7,023,995 B2   4/2006  Olsson
7,221,949 B2   5/2007  Clough
7,606,938 B2  10/2009  Roese et al.
8,429,086 B2   4/2013  Babitch et al.
2003/0217137 A1* 11/2003 Roese ............ G01S 5/02
                                                709/223
2011/0092185 A1   4/2011  Garskof
2012/0144470 A1   6/2012  Kim et al.
2012/0191614 A1*  7/2012  Babitch ......... G06Q 20/3829
                                                 705/71

FOREIGN PATENT DOCUMENTS

WO    2012110897    8/2012

OTHER PUBLICATIONS

J. Haeger, "Verifiable Location for Check-ins and Services Using Hardware Authentication Tokens", blog.julianhaeger.com, Feb. 7, 2012, pp. 1-2.

(Continued)

Primary Examiner — Marcos Batista
(74) Attorney, Agent, or Firm — Law Office of Jim Boice

(57) ABSTRACT

A mobile device is associated with a mobile communications network. The mobile device comprises: a transmitter for sending a request, to the mobile communications network, for a secure location verification (LV) message; a receiver for receiving the requested LV message, wherein the LV message is digitally secured so as to enable a selected third party application program to verify an authenticity of the LV message, wherein the LV message comprises location data determined by the mobile communications network as representing a location of the mobile device and identification data for identifying the mobile device; and the transmitter for sending the received LV message to the third party application program so as to enable the third party application program to verify the location of the mobile device.

20 Claims, 8 Drawing Sheets

(56) References Cited

OTHER PUBLICATIONS

Polaris Wireless, "RFPM, Radio Frequency Pattern Matching", Polaris Wireless, polariswireless.com, retrieved Nov. 25, 2014, pp. 1-2.

Anonymous, "Orange Partner", www.orangepartner.com, retrieved Nov. 25, 2014, p. 1.

* cited by examiner

MOBILE DEVICE LOCATION

BACKGROUND

The present invention relates to a system for verifying the location of a mobile device associated with a mobile communications network.

Computer systems commonly comprise a server application program arranged to provide services to one or more client application programs running on mobile devices. Such mobile devices are generally associated with a mobile communications network. For example, a user of a mobile device such as a smart phone may access banking server application program over a mobile communications network via a corresponding banking client application program running on the smart phone.

Some server application programs have security functionality, which relies on the location of a mobile device with which the server application program is interacting. For example, a financial interaction initiated by a client application program in a mobile device may only be permitted by the corresponding banking server application program if the banking server application program can verify the geographical or relative location of that mobile device. The location of the mobile device may be determined at the mobile device by know systems such as an onboard geographical position system (GPS), known wireless local area network (WLAN) base station location or mobile communication network location techniques such as cell location or signal trigonometry techniques.

SUMMARY

In an embodiment of the present invention, a mobile device is associated with a mobile communications network. The mobile device comprises: a transmitter for sending a request, to the mobile communications network, for a secure location verification (LV) message; a receiver for receiving the requested LV message, wherein the LV message is digitally secured so as to enable a selected third party application program to verify an authenticity of the LV message, wherein the LV message comprises location data determined by the mobile communications network as representing a location of the mobile device and identification data for identifying the mobile device; and the transmitter for sending the received LV message to the third party application program so as to enable the third party application program to verify the location of the mobile device.

In an embodiment of the present invention, a location server for use with a mobile communications network provides verification of the location of a mobile device associated with the mobile communications network. The location server comprises: a mobile network interface for receiving a request from a mobile device on a mobile network for location data for the mobile device; a location data interface for retrieving location data for the mobile device from the mobile network; and a processor configured to: build a location verification (LV) message comprising the retrieved location data for the mobile device and identification data identifying the mobile device; secure the LV message so as to enable a selected third party application program to verify an authenticity of the LV message; and transmit the LV message to the mobile device for subsequent provision to the third party application program to enable the third party application program to verify the location data for the mobile device.

In an embodiment of the present invention, an application server provides one or more location dependent services to a mobile device associated with a mobile communications network. The application server comprises: a mobile network interface operable to receive a digitally secured location verification (LV) message from a mobile device associated with a mobile communications network, the LV message comprising location data determined by the mobile communications network representing a location of the mobile device and identification data identifying the mobile device; and a processor arranged to: verify contents of the LV message; determine the location of the mobile device from the received location data; and provide one or more services to the mobile device in dependence on the location data.

BRIEF DESCRIPTION OF THE DRAWINGS

Preferred embodiments of the invention will now be described, by way of example only, with reference to the following drawings in which.

DETAILED DESCRIPTION

Figure 1:
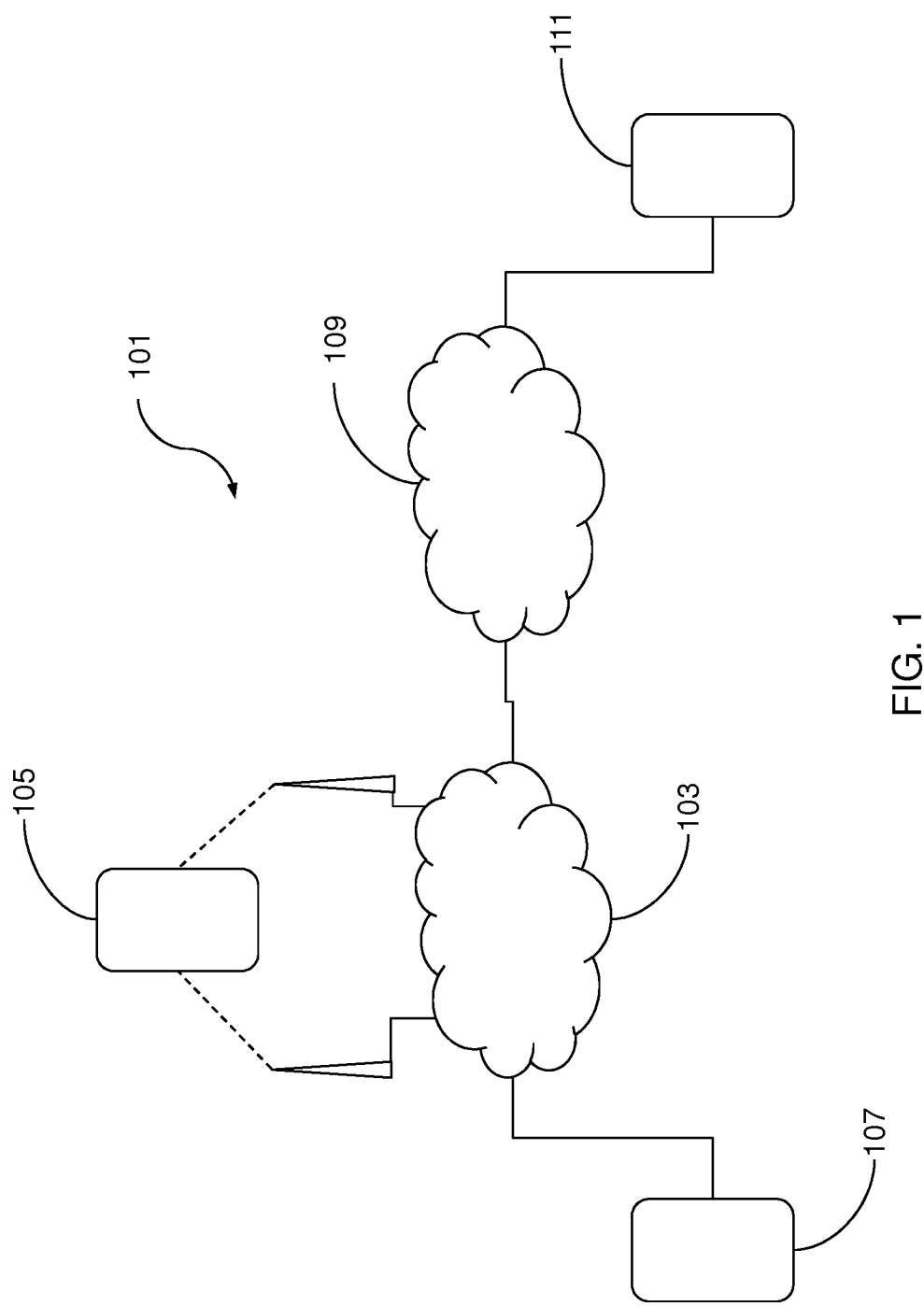
FIG. 1 is a schematic representation of a computer system comprising a mobile communications network connecting a mobile device to a first computer and a second computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals perse, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference to FIG. 1, a mobile communications system 101 comprises a first network 103 in the form of a mobile communications network, having a connected mobile device 105 and a first computer 107 connected thereto. The mobile communications network 103 is connected to a wide area network (WAN) 109. A second computer 111 is connected to the WAN 109. The mobile communications system 101 enables the mobile device 105 to communicate with the first computer 107 and the second computer 111.

Figure 2:
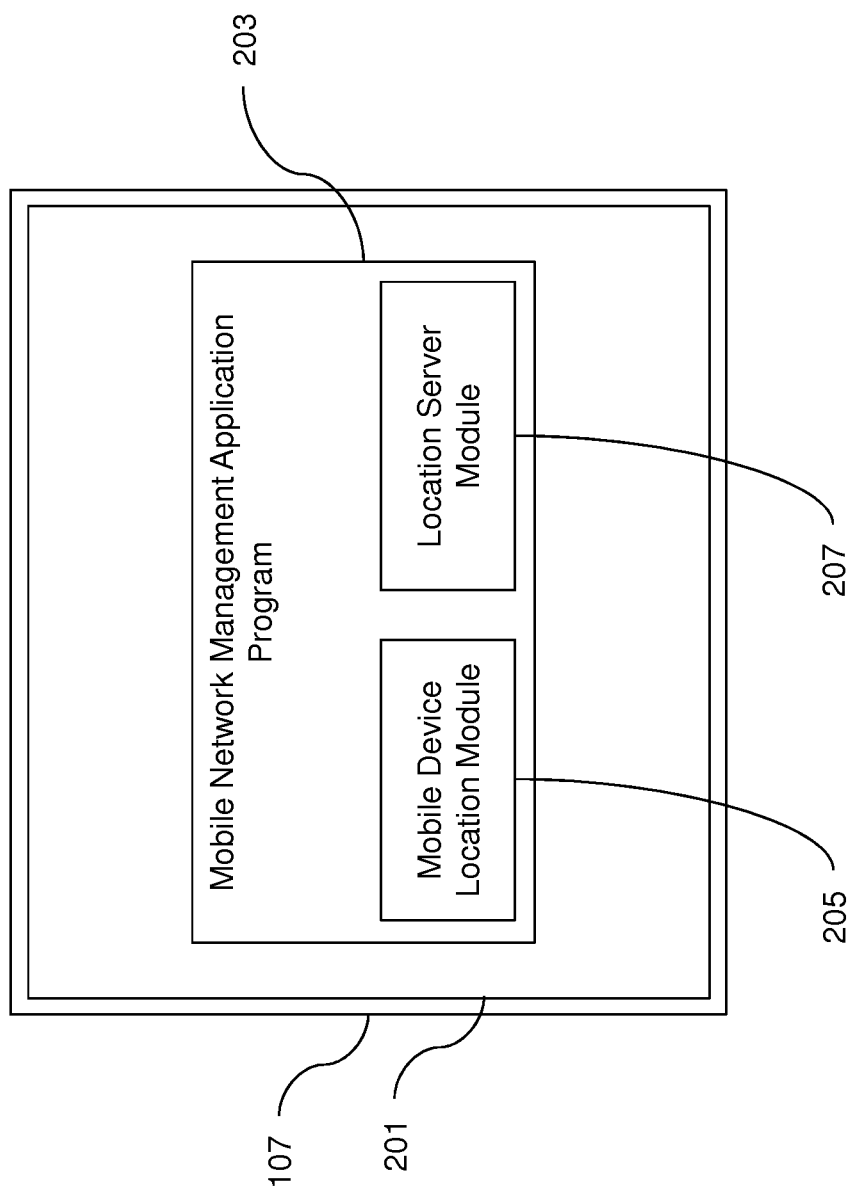
FIG. 2 is a schematic representation of the first computer of FIG. 1 running a mobile network management application program comprising location server logic.

With reference to FIG. 2, the first computer 107 is running an operating system 201 which provides a processing platform for a mobile network management application program 203 comprising processing logic arranged to manage communications between mobile devices, such as mobile device 105, over the mobile communications network 103 and to manage communications between the mobile devices and the WAN 109. The mobile network management application program 203 further comprises a mobile device location module 205 and a location server module 207.

The mobile device location module 205 comprises logic arranged to determine the location of any selected mobile device connected to the mobile network 103 using known techniques. In the present embodiment, the mobile device location module 205 uses a cell identification system to determine the location of a given mobile device. In the cell identification system, the geographical coverage of the mobile network 103 is divided into cells having a known location and served by known transceivers of the mobile network 103. The location of a connected mobile device is thus determined from the identification of the given cell from which the device is connecting to the network 103. The mobile device location module 205 is arranged to respond to a request from a given requestor for the location of an identified mobile device by determining the location of the device and providing this location data to the requestor. The location data further comprises a timestamp indicating the time and date at which the respective location data was determined.

The location server module 207 comprises logic arranged to produce a location verification (LV) message. The format of the LV message produced will be described further below with reference to FIG. 3. The location server module 207 produces an LV message in response to a request comprising data identifying a given mobile device such as the mobile device 105. In response to such a request, the location server module 207 is arranged to determine data representing the location of the mobile device 105 by requesting the location data from the mobile device location module 205. The mobile device location module 205 is then arranged to create an LV message comprising the received location data and an identification of the mobile device 105. The LV message is then secured so as to ensure a receiving party can verify the authenticity and integrity of the LV message. In the present embodiment, the location server module 207 is arranged to secure the LV message by applying a digital signature. The location server module 207 sends the digitally signed LV message to the requesting party.

Figure 3:
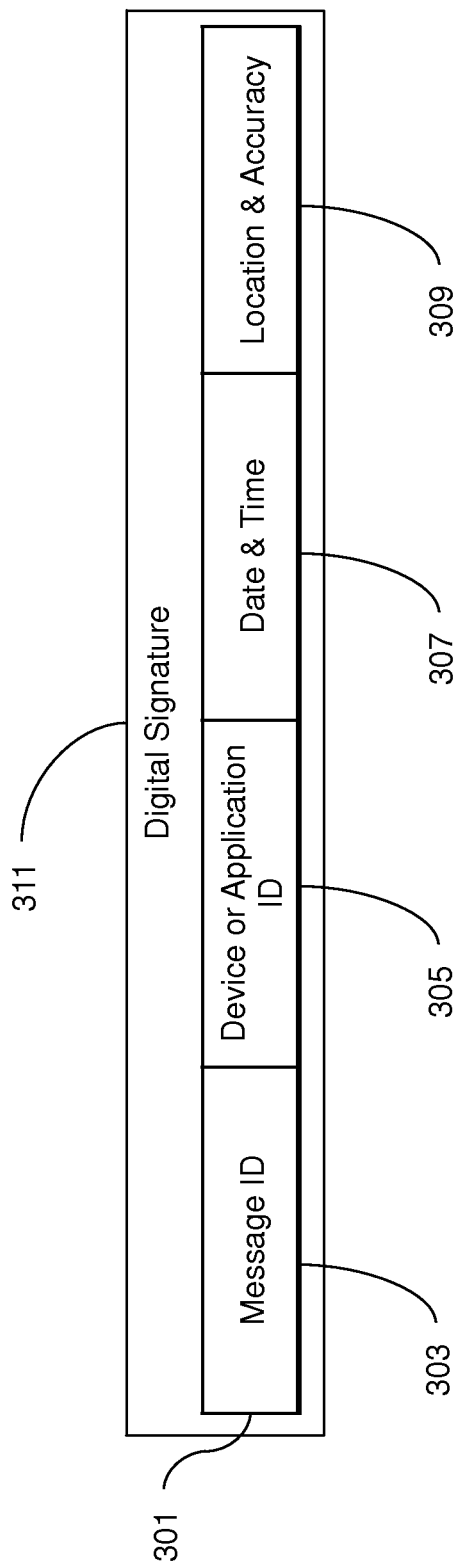
FIG. 3 is a schematic representation of a location verification (LV) message provided by the location server logic of FIG. 2.

With reference to FIG. 3, in the present embodiment, the LV message format 301 comprises a message identifier 303, a device identifier 305, a time stamp 307 and location data 309. The message identifier 303 is an identifier unique to any given LV message and is determined by the LV server module 207. The device identifier 305 is received in the received LV message request. In the present embodiment, the device identifier 305 is the International Mobile Station Equipment Identity (IMEI) number of the relevant mobile device 105. The time stamp 307 comprises data representing the date and time at which the corresponding location data 309 was determined by the mobile device location module 205. The location data 309 comprises an identification of a geographical area represented by a single geographical point and accuracy or resolution data. Together, the single geographical point and accuracy data define a geographical area, which represents the location of the relevant mobile device 105.

As noted above, the location server module 207 is arranged to secure the LV message using a digital signature 311. In the present embodiment, the location server module 207 is arranged to share the public key for the digital signature 311 with the relevant third parties so as to enable those third parties to verify the authenticity and integrity of a received LV message 301.

Figure 4:
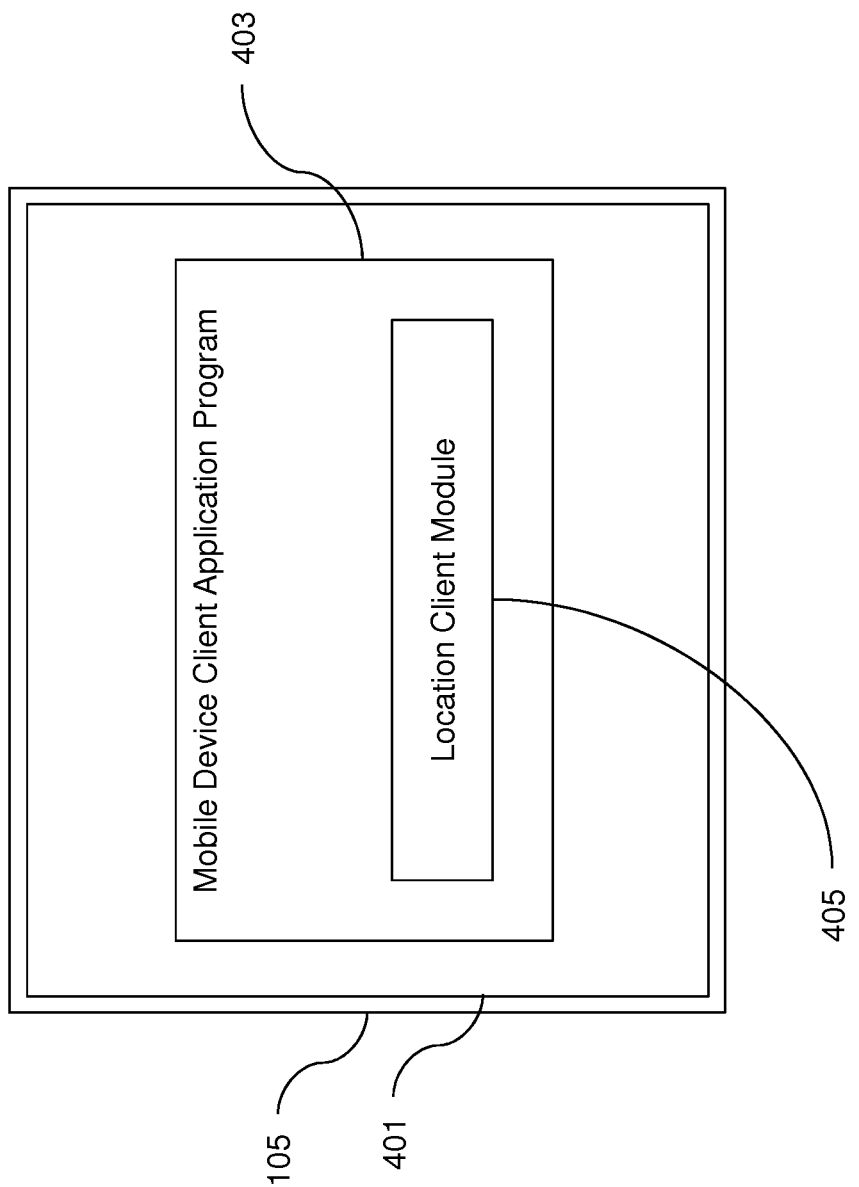
FIG. 4 is a schematic representation of the mobile device of FIG. 1 running a client application program comprising client location logic.

With reference to FIG. 4, the mobile device 105 is running an operating system 401, which provides a platform for the processing of one or more mobile device application programs commonly referred to as apps. In the present embodiment, the mobile device 105 is running a mobile device client application program 403 arranged to interact with one or more corresponding server application programs via the networks 103, 109. The mobile device client application program (mobile client) 403 comprises a location client module 405 that provides logic arranged to request an LV message from the mobile network 103. In the present embodiment, the mobile client 403 initiates the request to the location client module 405. The LV message request comprises the IMEI number for the mobile device 105. Such LV message requests are identified by the mobile network 103 from the message identifier 303 and consequently routed to the location server module 207. The location server module 207 responds to the mobile client 403 as described above with a digitally signed LV message comprising the current location data 309 for the mobile device 105. In response to the receipt of the LV message, the mobile client 403 is arranged to forward the LV message via the networks 103, 109 to a relevant server application programs, in response to a requirement from that server application program to establish the physical location of the mobile device 105.

Figure 5:
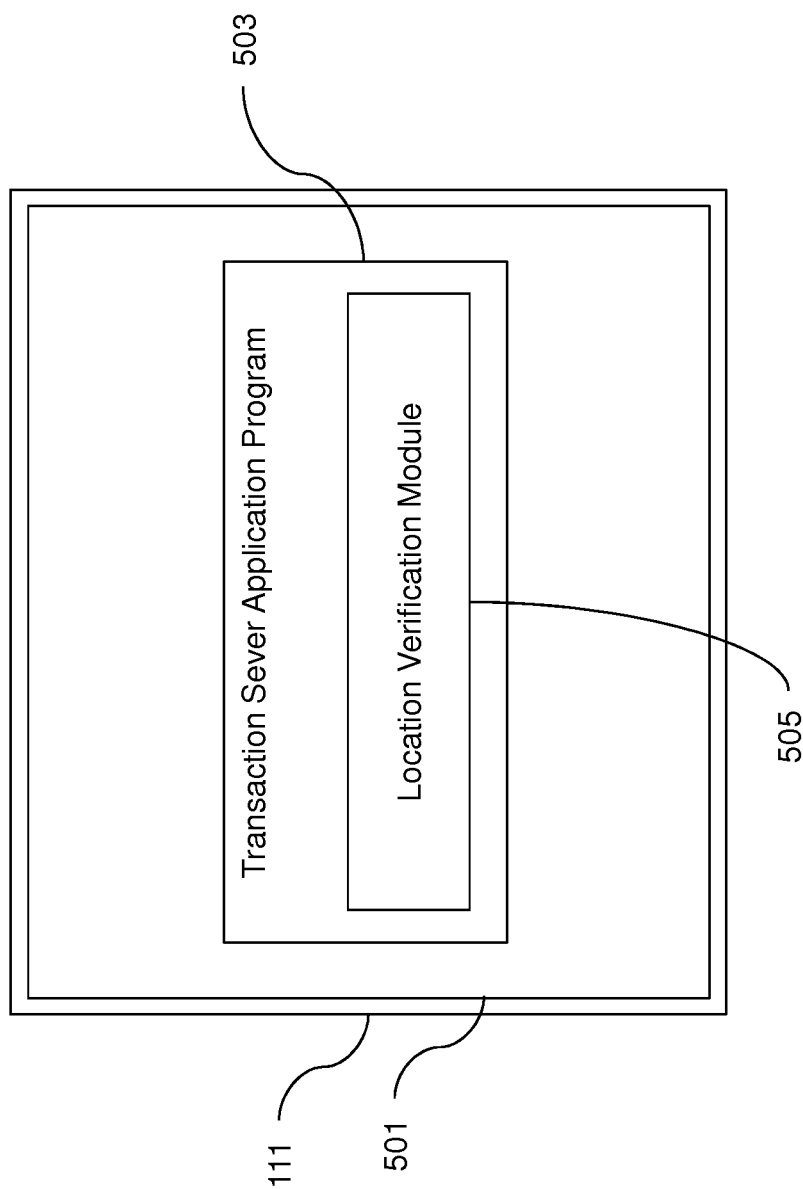
FIG. 5 is a schematic representation of the second computer of FIG. 1 running a transaction server application program comprising location verification logic.

With reference to FIG. 5, the second computer 111 is running an operating system 501, which provides a processing platform for a transaction server application program (transaction server) 503. The transaction server 503 comprises logic arranged to provide transaction-based services, such as banking services, via mobile devices such as the mobile device 105. In other words, the transaction server 503 is one of the application programs described above arranged to interact with the mobile client 403 of FIG. 4. The transaction server 503 comprises a location verification module 505 providing logic arranged to receive an LV message from the mobile client 403 and to verify the authenticity and integrity of a received LV message using the relevant public key for the LV message. Having thus verified the received LV message, the location verification module 505 is arranged to extract the location data 309 and time stamp data 307 for provision to the transaction server 503. The transaction server 503 of the present embodiment comprises security procedures that only allow selected services to be provided to mobile devices within predetermined geographical areas. Thus if the received location data 309 indicates that the mobile device 105 is within an appropriate geographical area then the selected services of the transaction server 503 are provided on the mobile client 403.

Figure 6:
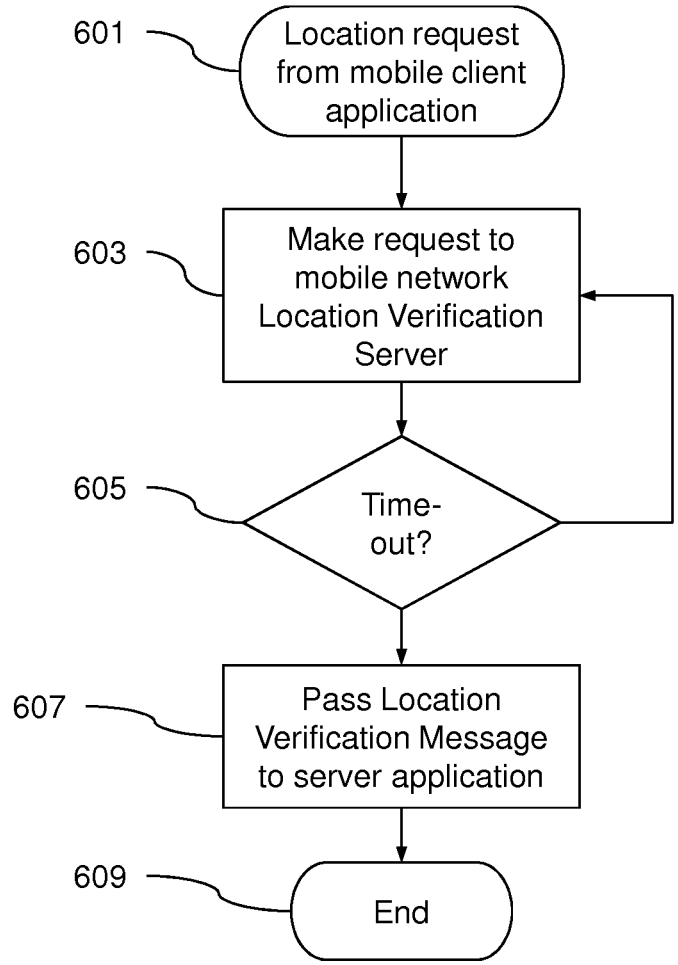
FIG. 6 is a flow chart illustrating the processing performed by the client location logic of FIG. 4 in response to a request for a LV message.

The processing performed by the location client module 405 of the mobile client 401 will now be described with reference to FIG. 6. Processing is initiated at step 601 in response to a request for an LV message received from the mobile client 401 and processing moves to step 603. At step 603 a request including the IMEI number of the mobile device 105 is sent to the location server module 207 via the mobile network 103 and processing moves to step 605. At step 605 processing waits for a predetermined time period for a response from the location server module 207 and on receipt of the requested LV message processing then moves to step 607. At step 607 the received LV message is returned to the mobile client 403 for forwarding via the networks 103, 109 to the transaction server 503. Processing then moves to step 609 and ends. If at step 605 no LV message is received before the expiry of the predetermined time limit then processing returns to step 603 to repeat the request. After three unsuccessful requests for an LV message processing ends after returning a failure message to the mobile client 401.

Figure 7:
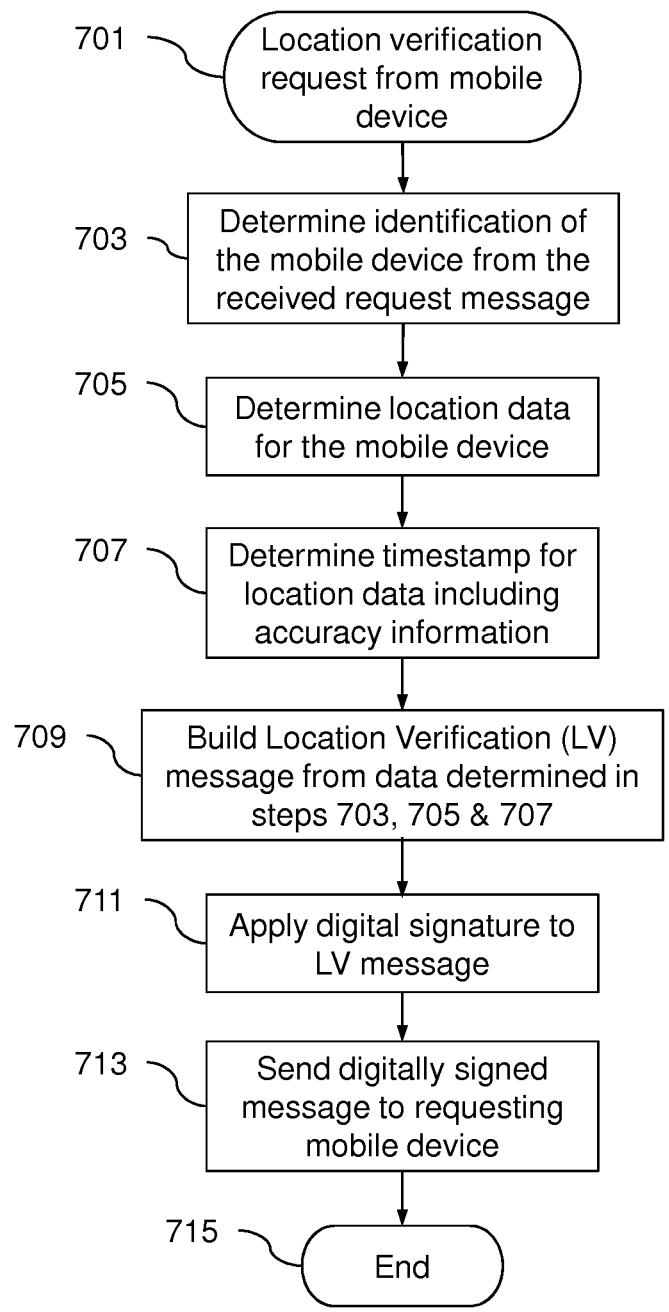
FIG. 7 is a flow chart illustrating the processing performed by the location server logic of FIG. 2 in response to a request for an LV message from the mobile device of FIG. 4.

The processing performed by the location server module 207 of the mobile network management application program 203 in response to a request for an LV message will now be described with reference to FIG. 7. Processing is initiated at step 701 in response to the receipt of an LV message request from the location client module 405 and processing then moves to step 703. At step 703 the IMEI number for the requesting mobile device 105 is extracted from the LV message request and processing moves to step 705. At step 705 the location for the mobile device 105 is determined from the mobile device location module 205 using the IMEI number and processing moves to step 707. At step 707 the time stamp and accuracy data is determined from the response from the mobile device location module 205 and processing moves to step 709. At step 709 a location verification message 301 is built from the data determined in steps 703, 705 and 707 and processing moves to step 711. At step 711 the digital signature 311 is applied to the assembled LV message 301 and processing moves to step 713. At step 713 the digitally secured LV message 301 is sent to the requesting mobile client 401 of the mobile device 105 over the mobile network 103. Processing then moves to step 715 and ends.

Figure 8:
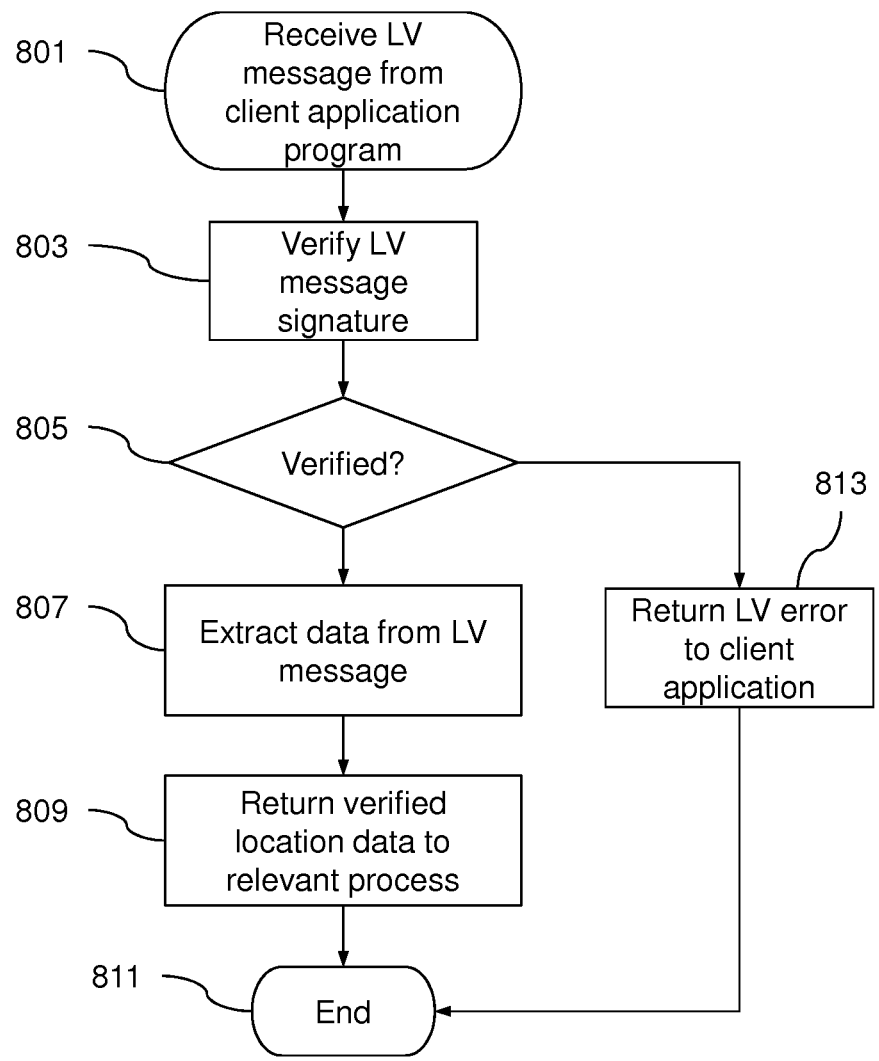
FIG. 8 is a flow chart illustrating the processing performed by the location verification logic of FIG. 5 in response to the receipt of an LV message from the mobile device of FIG. 4.

The processing performed by the location verification module of the transaction server 503 in response to the receipt of an LV message will now be described with reference to the flow chart of FIG. 8. Processing is initiated at step 801 in response to the receipt of an LV message from the mobile client 403 and processing moves to step 803. At step 803 the public key for the LV message is applied to the received message so as to verify the authenticity and integrity and processing then moves to step 805. At step 805, if the verification process of step 803 was successful then processing moves to step 807 where the authenticated data is extracted from the received LV message and processing moves to step 809. At step 809 the extracted data is provided to the transaction server 503 for use in the relevant location verification process for providing one or more location dependent services for the mobile client 403. Processing then moves to step 811 and ends. If at step 803 the verification of the LV message fails then from step 805 processing moves to step 813 where a verification error is returned to the transactions server 503. Processing then moves to step 811 and ends.

In a further embodiment, the mobile device requests an identifier from the party requiring verification of the location of the mobile device such as the transaction server as described above. The transaction server, for example, provides a unique identifier, such as a transaction identifier or other suitable one-time token, to the mobile device, which uses this supplied identifier in its request to the location server module for an LV message. The provided LV message is then passed by the mobile device to the transaction server. Thus the transaction server can verify both the location of the mobile device and that the relevant transaction or user-session is being performed on that mobile device. In other words, in this embodiment, the location of the mobile device is tied securely to the relevant transaction. Therefore, since the transaction identifier is signed by the location server module, a malicious replay attack attempting to subvert the transaction server is bound to fail.

In another embodiment, the request for an LV message is initiated by the server application program, such as the transaction server, and sent to the client application program.

In a further embodiment, the client application on the mobile device is arranged to requests an identifier, for identifying the mobile device, from the server application program, such as the transaction server. The identifier indicated by the server application is then used for requesting an LV message from the location server functionality via the mobile network. The identifier may comprise a transaction identifier arranged to identify a relevant transaction between the client and server applications.

In another embodiment, the location server functionality is arranged to forward the LV message directly to the server application, such as the transaction server. As will be understood by those skilled in the art, such an LV message may comprise an identifier arranged to enable the receiving server application to identify the received LV message as relating to its interaction with the relevant client application and corresponding mobile device.

Embodiments of the invention devolve the determination of the location of the mobile device to a dedicated function provided by the mobile network. The location data is secured under the control of the mobile network. These features enable a server application to reliably verify the location of a mobile client application with reduced susceptibility to tampering. Since the mobile device interacts directly with the location server in the mobile network, the location server can use known network techniques and mechanisms to verify the identity of the mobile device with which it is interacting. Thus the use of insecure location techniques or mechanisms is reduced.

Embodiments of the invention enable the location verification process, between the mobile device and the services it interacts with, to be made directly and thus simplified. In other words, the verification of the location of the mobile device does not need to be mediated via a third entity providing the location data. Furthermore, the architecture supports a larger number of different mobile operators, each with its own location server and corresponding public certificates.

As will be understood by those skilled in the art, the LV message as described above may be augmented with further data or comprise only the location data. Furthermore, in a minimal embodiment, only the location data need be secured, for example, by being digitally signed.

As will be understood by those skilled in the art, the identifier used in the LV message for uniquely identifying the mobile device may be any suitable identifier depending on the given application. For example, the identifier may comprise the IMEI number as described above or the International Mobile Subscriber Entity (IMSI) number or the Mobile Subscriber Integrated Services Digital Network (MSISDN) number or any other suitable identifier.

As will be understood by those skilled in the art, any other suitable mechanism for securing the LV message may be utilized that enables the receiving party to verify the authenticity and integrity of the LV message.

As will be understood by those skilled in the art, the functionality of the location server and client modules as described herein may be provided by any suitable means such as by incorporation in other programs or as stand-alone programs, modules or plug-ins. Such functionality may be provided at any physical location accessible via one or more networks.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

A system for verifying the location of a mobile device is disclosed in which the mobile device is associated with a mobile communications network and interacts with a server application program requiring verification of the geographical location of the mobile device.

An aspect of the invention provides a mobile device associated with a mobile communications network, the mobile device comprising processing means operable to: send a request to the mobile communications network for a secure location verification (LV) message; receive the requested LV message, the LV message being digitally secured so as to enable a selected third party application program to verify the authenticity of the LV message, the LV message comprising location data determined by the mobile communications network representing the location of the mobile device and identification data for identifying the mobile device; and send the received LV message to the third party application program so as to enable the third party application program to verify the location of the mobile device.

The request for the LV message may be initiated by the third party application program. The identification data may be provided by the third party application program. The third party application program may comprise a transaction server and the identification data comprises a transaction identifier. The identification data may comprise data for identifying the mobile device on the mobile communications network. The received LV message may be digitally signed and the third party application program provided with access to the public key for the digital signature. The LV message may comprise time stamp data corresponding to the location data.

Another aspect of the invention provides a location server for use with a mobile communications network for providing verification of the location of a mobile device associated with the mobile communications network, the location server comprising: a mobile network interface for receiving a request from a mobile device on a mobile network for location data for the mobile device; location data interface for retrieving location data for the mobile device from the mobile network; and a processor operable to: build a location verification (LV) message comprising the retrieved location data for the mobile device and identification data identifying the mobile device; secure the LV message so as to enable a selected third party application program to verify the authenticity of the LV message; and transmit the LV message to the mobile device for subsequent provision to the third party application program to enable the third party application program to verify the location data for the mobile device.

The LV message may be digitally signed and the public key for the digital signature provided to the third party application program. The LV message may be communicated to the mobile device over the mobile network.

A further aspect of the invention provides an application server arranged to provide one or more location dependent services to a mobile device associated with a mobile communications network, the application server comprising: a mobile network interface operable to receive a digitally secured location verification (LV) message from a mobile device associated with a mobile communications network, the LV message comprising location data determined by the mobile communications network representing the location of the mobile device and identification data identifying the mobile device; a processor arranged to: verify the contents of the LV message; determine the location of the mobile device from the received location data; and provide one or more services to the mobile device in dependence on the location data.

In one embodiment, the request for the LV message is initiated by the application server. The identification data may be provided by the application server in the request. The application server may comprise a transaction server and the identification data comprises a transaction identifier. The received LV message may be digitally signed and the application server provided with access to the public key for the digital signature. The LV message may comprise time stamp data corresponding to the location data.

Another aspect of the invention provides a method for a mobile device associated with a mobile communications network for providing verification of the location of the mobile device to a third party application program, the method comprising the steps of: sending a request to the mobile communications network for a secure location verification (LV) message; receiving the requested LV message, the LV message being digitally secured so as to enable a selected third party application program to verify the authenticity of the LV message, the LV message comprising location data determined by the mobile communications network representing the location of the mobile device and identification data for identifying the mobile device; and sending the received LV message to the third party application program so as to enable the third party application program to verify the location of the mobile device.

A further aspect of the invention provides a method for a location server for a mobile communications network for providing verification of the location of a mobile device associated with the mobile communications network, the method comprising the steps of: receiving request from a mobile device on a mobile network for location data for the mobile device; retrieving location data for the mobile device from the mobile network; building a location verification (LV) message comprising the retrieved location data and identification data identifying the mobile device; securing the LV message so as to enable a selected third party application program to verify the authenticity of the LV message; and providing the LV message to the mobile device for subsequent provision to the third party application program to enable the third party application program to verify the location of the mobile device.

Another aspect of the invention provides a method for use by an application server arranged to provide one or more location dependent services to a mobile device associated with a mobile communications network, the method comprising the steps of: receiving a digitally secured location verification (LV) message from a mobile device associated with a mobile communications network, the LV message comprising location data determined by the mobile communications network representing the location of the mobile device and identification data identifying the mobile device; verifying the contents of the LV message; determining the location of the mobile device from the received location data; and providing one or more services to the mobile device in dependence on the location data.

A further aspect of the invention provides a computer program product for a mobile device associated with a mobile communications network for providing verification of the location of the mobile device to a third party application program, the computer program product comprising a computer-readable storage medium having computer-readable program code embodied therewith, the computer-readable program code configured to: send a request to the mobile communications network for a secure location verification (LV) message; receive the requested LV message, the LV message being digitally secured so as to enable a selected third party application program to verify the authenticity of the LV message, the LV message comprising location data determined by the mobile communications network representing the location of the mobile device and identification data for identifying the mobile device; and send the received LV message to the third party application program so as to enable the third party application program to verify the location of the mobile device.

Another aspect of the invention provides a computer program product for a location server for a mobile communications network for providing verification of the location of a mobile device associated with the mobile communications network, the computer program product comprising a computer-readable storage medium having computer-readable program code embodied therewith, the computer-readable program code configured to: receive request from a mobile device on a mobile network for location data for the mobile device; retrieve location data for the mobile device from the mobile network; build a location verification (LV) message comprising the retrieved location data and identification data identifying the mobile device; secure the LV message so as to enable a selected third party application program to verify the authenticity of the LV message; and provide the LV message to the mobile device for subsequent provision to the third party application program to enable the third party application program to verify the location of the mobile device.

A further aspect of the invention provides a computer program product for use by an application server arranged to provide one or more location dependent services to a mobile device associated with a mobile communications network, the computer program product comprising a computer-readable storage medium having computer-readable program code embodied therewith, the computer-readable program code configured to: receive a digitally secured location verification (LV) message from a mobile device associated with a mobile communications network, the LV message comprising location data determined by the mobile communications network representing the location of the mobile device and identification data identifying the mobile device; verify the contents of the LV message; determine the location of the mobile device from the received location data; and provide one or more services to the mobile device in dependence on the location data.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A mobile device associated with a mobile communications network, the mobile device comprising:
   a transmitter for sending a request, to a first computer coupled to the mobile communications network, for a secure location verification (LV) message, wherein the first computer comprises a mobile device location processor for identifying a real-time location of the mobile device, wherein the first computer comprises a location server module for producing the secure LV message, wherein the mobile device location processor determines the real-time location of the mobile device by identifying a cell within a cellular network that is currently being used by the mobile device, and wherein the location server processor produces the secure LV message in response to receiving the request that includes a device identifier of the mobile device;
   a receiver for receiving the secure LV message, wherein the secure LV message is digitally secured so as to enable a selected third party application program on a second computer to verify an authenticity of the secure LV message, wherein the secure LV message comprises location data determined by the mobile communications network as representing a location of the mobile device and identification data for identifying the mobile device, and wherein a single geographical point and resolution data in the secure LV message define a geographical area in which the mobile device is currently located; and
   the transmitter for sending the secure LV message to the third party application program on the second computer so as to enable the third party application program to verify the location of the mobile device, wherein the second computer provides multiple selected services to the mobile device based on a combination of the real-time location of the mobile device and the identification data for the mobile device that have been established by the first computer.

2. The mobile device according to claim 1, wherein the request for the secure LV message is initiated by the third party application program.

3. The mobile device according to claim 1, wherein the identification data is provided by the third party application program.

4. The mobile device according to claim 1, wherein the third party application program comprises a transaction provider and the identification data comprises a transaction identifier.

5. The mobile device according to claim 1, further comprising:
   one or more processors in the mobile device for detecting that more than a predefined quantity of requests for the secure LV message have been transmitted to the first computer without successful receipt of the secure LV message; and
   one or more processors in the mobile device for, in response to detecting that more than the predefined quantity of requests for the secure LV message have been transmitted without successful receipt of the secure LV message, blocking the second computer from providing the multiple selected services to the mobile device.

6. The mobile device according to claim 1, wherein the secure LV message is digitally signed by a digital signature, and wherein the third party application program is provided with access to a public key for the digital signature.

7. The mobile device according to claim 1, wherein the secure LV message comprises time stamp data corresponding to the location data.

8. A location server for use with a mobile communications network for providing verification of a location of a mobile device associated with the mobile communications network, wherein the location server is a first computer coupled to the mobile communications network, and wherein the location server comprises:
   a mobile network interface for receiving a request from a mobile device on a mobile network for a secure location verification (LV) message, wherein the secure LV message comprises location data determined by the mobile communications network as representing a location of the mobile device and identification data for identifying the mobile device;

a location data interface for retrieving location data for the mobile device from the mobile network, wherein the first computer comprises a mobile device location processor for identifying a real-time location of the mobile device, wherein the first computer comprises a location server processor for producing the secure LV message, wherein the mobile device location processor determines the real-time location of the mobile device by identifying a cell within a cellular network that is currently being used by the mobile device, and wherein the location server processor produces the secure LV message in response to receiving the request that includes a device identifier of the mobile device; and a processor configured to:
build the secure LV message comprising the retrieved location data for the mobile device and identification data identifying the mobile device, wherein a single geographical point and resolution data in the secure LV message define a geographical area in which the mobile device is currently located;

secure the secure LV message so as to enable a selected third party application program on a second computer to verify an authenticity of the secure LV message; and transmit the secure LV message to the mobile device for subsequent provision to the third party application program on the second computer to enable the third party application program to verify the location data for the mobile device, wherein the second computer provides multiple selected services to the mobile device based on a combination of the real-time location of the mobile device and the identification data for the mobile device that have been established by the first computer.

9. The location server according to claim 8, wherein the secure LV message is digitally signed by a digital signature, and wherein a public key for the digital signature is provided to the third party application program.

10. The location server according to claim 8, wherein the secure LV message is communicated to the mobile device over the mobile network.

11. The location server according to claim 8, wherein the request from the mobile device is a request for the secure LV message, and wherein the request for the secure LV message is initiated by the third party application program.

12. The location server according to claim 8, wherein the identification data is provided by the third party application program.

13. The location server according to claim 8, wherein the third party application program comprises a transaction provider and the identification data comprises a transaction identifier.

14. The location server according to claim 8, wherein the secure LV message is digitally signed by a digital signature, and wherein the third party application program is provided with access to a public key for the digital signature.

15. An application server arranged to provide multiple location dependent services to a mobile device associated with a mobile communications network, the application server comprising:

a mobile network interface operable to receive a digitally secured location verification (LV) message from a mobile device associated with a mobile communications network, the digitally secured LV message comprising location data determined by the mobile communications network representing a location of the mobile device and identification data identifying the mobile device, wherein the location data identifies a cell within a cellular network that is currently being used by the mobile device; and a processor arranged to:
verify contents of the digitally secured LV message, wherein the digitally secured LV message is digitally secured so as to enable an application program from the application server to verify an authenticity of the digitally secured LV message, wherein the digitally secured LV message comprises location data determined by the mobile communications network as representing a location of the mobile device and identification data for identifying the mobile device, and wherein a single geographical point and resolution data in the digitally secured LV message define a geographical area in which the mobile device is currently located;

determine and verify the location of the mobile device based on information from the digitally secured LV message; and provide multiple services to the mobile device in dependence on the location data found in the digitally secured LV message, wherein the multiple services are available to the mobile device only within a current location of the mobile device as described by the received location data found in the digitally secured LV message.

16. The application server according to claim 15, wherein a request for the digitally secured LV message is initiated by the application server.

17. The application server according to claim 16, wherein the identification data is provided by the application server in the request.

18. The application server according to claim 15, wherein the application server comprises a transaction server and the identification data comprises a transaction identifier.

19. The application server according to claim 15, wherein a received LV message is digitally signed by a digital signature, and wherein the application server is provided with access to a public key for the digital signature.

20. The application server according to claim 15, wherein the digitally secured LV message comprises a time stamp data corresponding to the location data.

* * * * *